United States Patent
Lietzman et al.

(10) Patent No.: US 11,806,881 B1
(45) Date of Patent: Nov. 7, 2023

(54) ARTIFICIAL INTELLIGENCE SYSTEM FOR AUTOMATIC TRACKING AND BEHAVIOR CONTROL OF ANIMATRONIC CHARACTERS

(71) Applicant: Multimedia LED, Inc., Corona, CA (US)

(72) Inventors: Frederick N. Lietzman, Corona, CA (US); Alexander Donald Birner, Corona, CA (US)

(73) Assignee: Multimedia LED, Inc., Corona, CA (US)

( * ) Notice: Subject to any disclaimer, the term of this patent is extended or adjusted under 35 U.S.C. 154(b) by 129 days.

(21) Appl. No.: 17/343,262

(22) Filed: Jun. 9, 2021

Related U.S. Application Data (60) Provisional application No. 63/036,938, filed on Jun. 9, 2020.

(51) Int. Cl.
  *B25J 9/16* (2006.01)
  *B25J 11/00* (2006.01)

(52) U.S. Cl.
  CPC ........... *B25J 9/1697* (2013.01); *B25J 9/1674* (2013.01); *B25J 11/003* (2013.01)

(58) Field of Classification Search
  CPC .................. B25J 9/1697; B25J 9/16; B25J 9/1628–1633; B25J 9/1646; B25J 9/1661; B25J 9/1669; B25J 9/1674; B25J 9/1679; B25J 11/003; B25J 11/0035; B25J 11/004; B25J 11/0005–0015; A63H 13/00–20; A63H 11/00–205
  See application file for complete search history.

(56) References Cited

U.S. PATENT DOCUMENTS

| | | | |
|---|---|---|---|
| 2009/0298603 A1* | 12/2009 | Crawford | A63G 4/00 472/137 |
| 2019/0184572 A1* | 6/2019 | Hayashi | B25J 5/007 |
| 2020/0265604 A1* | 8/2020 | Lin | G06V 40/161 |
| 2021/0331706 A1* | 10/2021 | Kim | B60Q 9/00 |

* cited by examiner

*Primary Examiner* — Spencer D Patton
(74) *Attorney, Agent, or Firm* — Eric Karich; Karich & Associates (57) ABSTRACT

An animatronics system uses a camera for detecting a person, and an enhanced interaction controller, operably connectable with an animatronics character, for providing entertainment to persons nearby. A tracking program utilizes human presence detection, via input from the camera, to detect and recognize the person for tracking the person and determining when the person enters a predetermined range. The enhanced control program performs, in response to the tracking program determining that the person entered within the predetermined range of the animatronic character, an entertainment routine directed to the person.

12 Claims, 5 Drawing Sheets

ARTIFICIAL INTELLIGENCE SYSTEM FOR AUTOMATIC TRACKING AND BEHAVIOR CONTROL OF ANIMATRONIC CHARACTERS

Cross-Reference to Related Applications

This application for a utility patent claims the benefit of U.S. Provisional Application No. 63/036,938, filed Jun. 9, 2020.

BACKGROUND OF THE INVENTION

Field of the Invention:

This invention relates generally to animatronics system, and more particularly to an animatronics system that is operatively controlled by an enhanced interaction controller that utilizes artificial intelligence (AI), convolutional neural network (CNN), and machine learning (ML) to enhance the performance of animatronic characters.

Description of Related Art:

While artificial intelligence (AI) has come a long way the last ten years, animatronic technology has not. Animatronics are still the same puppets as they were fifty years ago. More sophisticated, but still just a puppet. This invention will combine state of the art animatronic performance technology, with artificial intelligence, convolutional neural networks (CNN), and machine learning (ML), in a novel way, thus creating a unique hybrid performance robot. Unlike a puppet, this robot can utilize its artificial intelligence and react in real-time to the changing environment around it. Each robot performance will be unique and no two performances are the same. Traditional animatronic characters are controlled by one device, the generic show controller, built for playback of synchronous audio, video, animation, lighting, and mechanical action.

Our application requires two different components of control running at the same time, which would convert the puppet into an intelligent robot. The first part, a Show Controller (SC), to which plays the show as programmed, in a manner that is similar to prior art systems. In the present invention, the system further includes an enhanced interaction controller that operates in the background. This second part of the system may be interfaced directly into the Show controller (SC) and is capable of taking over control of the robots actuators/motors, speakers, and other components. The system is constantly watching the environment in the background during the (SC) performance and is ready to automatically interact with its human counterparts. Once triggered the system responds by overriding the servo control signals coming from the Show Controller so it can freely interact with the human or humans around it (one or multiple targets). The inventive system will automatically respond to the constantly changing environment around it, operating within preset safety limits.

SUMMARY OF THE INVENTION

The present invention teaches certain benefits in construction and use which give rise to the objectives described below.

The present invention provides an animatronics system that includes a camera for detecting the person; and an enhanced interaction controller, operably connectable with an animatronics character, the comprising a computer processor and a computer memory having an enhanced control program and a tracking program for tracking the person. The tracking program utilizes human presence detection, via input from the camera, to detect and recognize the person for tracking the person and determining when the person enters a predetermined range. The enhanced control program performs the following steps, wherein in response to the tracking program determining that the person entered within the predetermined range of the animatronic character, turning the animatronics character to face the person, and performing an entertainment routine directed to the person.

A primary objective of the present invention is to provide an animatronics system having advantages not taught by the prior art.

Another objective is to provide an animatronics system that is able to augment the interactions of an animatronics character to appear more lifelike, and more entertaining to persons nearby.

Another objective is to provide an animatronics system that is able to utilize artificial intelligence (AI), convolutional neural network (CNN), and machine learning (ML) to adapt to an environment and perform more entertaining performances.

Another objective is to provide an animatronics system that is able to react to a person based upon distance from the person, so that performances match the expectations of the audience.

A further objective is to provide an animatronics system that is able to react to persons around the animatronics system, to provide a lifelike interaction.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, an animatronics system for operatively controlling an animatronics character for enhanced interaction with nearby people.

Figure 1:
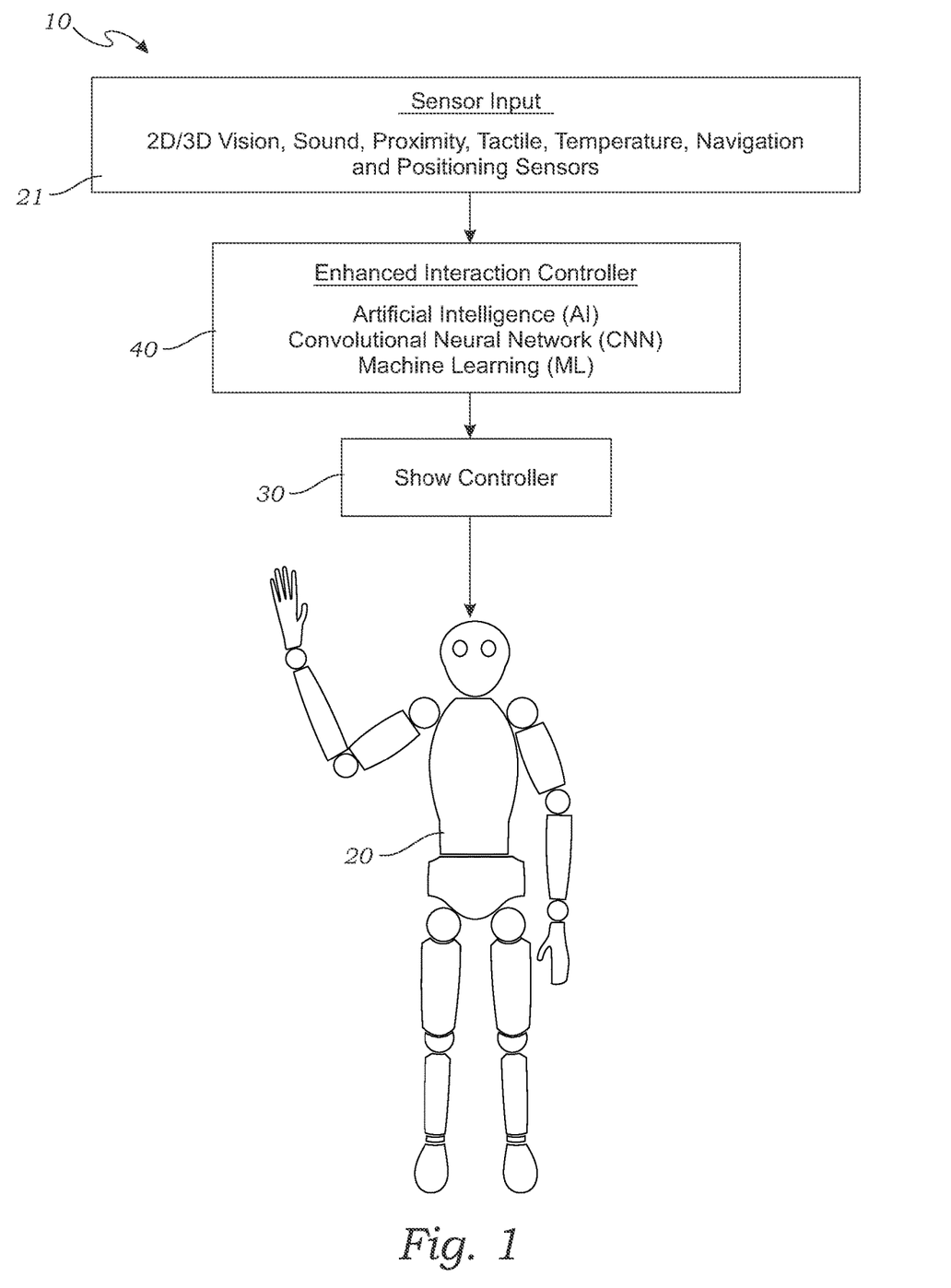
FIG. 1 is a block diagram of one embodiment of an animatronics system according to the present invention, illustrating the relationship between an enhanced interaction controller and a show controller and an animatronic character.

FIG. 1 is a block diagram of one embodiment of an animatronics system 10 according to the present invention, illustrating the relationship between sensor inputs 21, an animatronic character 20 and a show controller 30 and an enhanced interaction controller 40. These components may be operatively connected via a network, which may include any form of wired or wireless network commonly used for communicating information from one computer device to another. For example, a global computer network (e.g., the Internet) may be used, including any form of local area networks (LANs), wide area networks (WANs), direct connections, such as through a universal serial bus (USB) port, other forms of computer-readable media, or any combination thereof. Furthermore, the system server may include one or more servers, desktop computers, multiprocessor systems, microprocessor-based or programmable electronics devices or controllers, network appliances, or any form of equivalent device(s) known in the art.

The system 10 may be in the form of a single device (potentially integral with the character 20, or multiple devices distributed in any manner desired by those skilled in the art. So, for example, while we discuss an embodiment that includes the show controller 30 and the enhanced interaction controller 40 as separate units, these both could be combined in a single unit, within or separate from the character 20.

Figure 2:
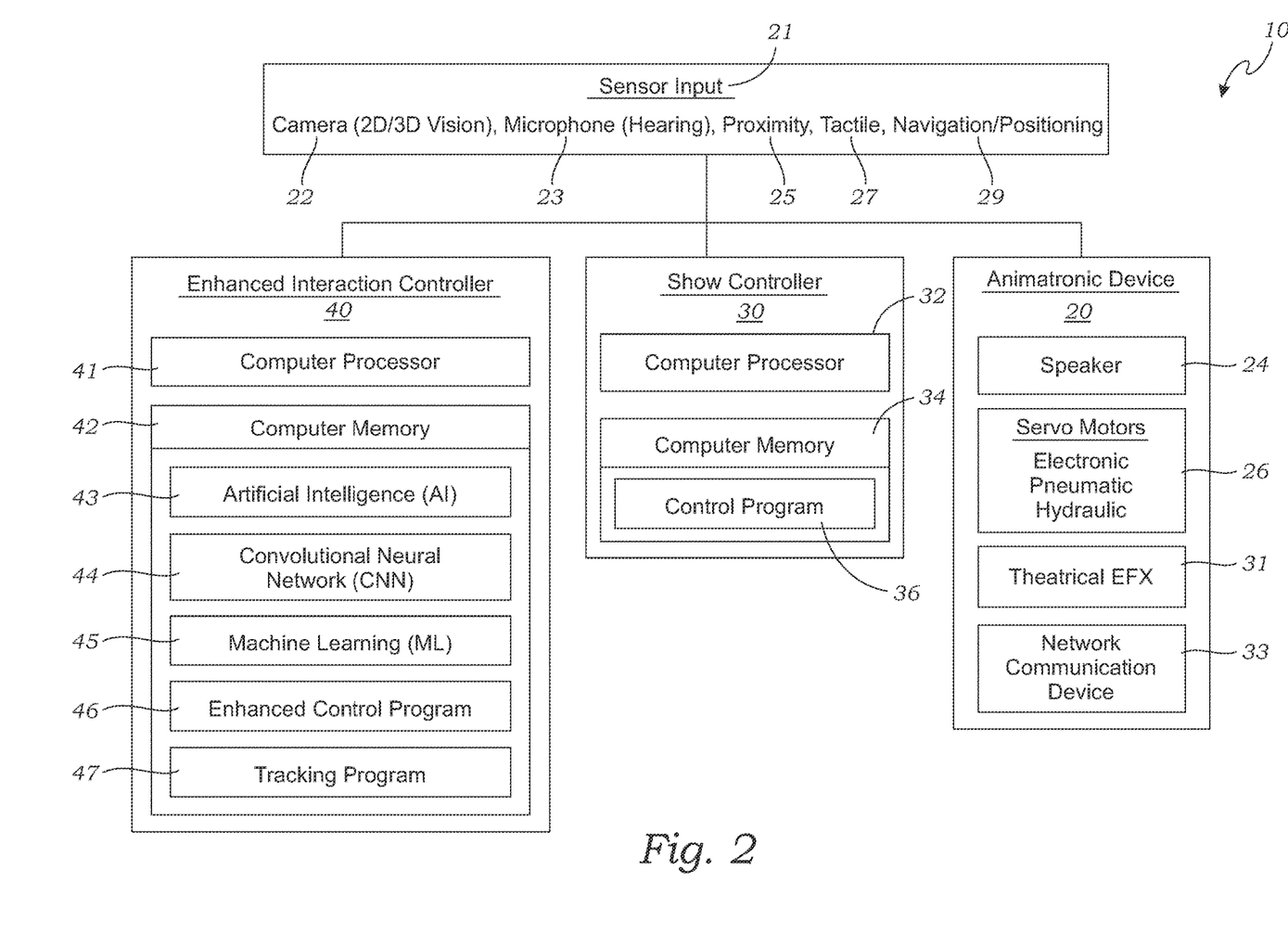
FIG. 2 is a block diagram illustrating further details of the animatronics system.

FIG. 2 is a block diagram illustrating further details of the animatronics system 10. As shown in FIG. 2, the animatronics system 10 may include a variety of the sensor inputs 21, which may be located on or around the character 20, which help direct and control the character 20.

The sensor inputs 21 may include a 2D or 3D vision device, such as a camera 22, for identifying persons (targets) around the character, as discussed in greater detail below. The inputs 21 may also include a microphone 23 (for hearing), a proximity sensor for range detection 25, a tactile input 27, a navigation/positioning sensor (GPS) 29, and servo motors 26 for controlling the movement of the character. The camera 22 may be mounted on the animatronic character 20 (e.g., as an eye), or anywhere else deemed suitable.

The animatronic character 20 may further include a proximity sensor 25 for detecting the distance of people who are in the vicinity, as discussed in greater detail below. The animatronic character 20 may further include a tactile sensor 27 for grasping an object. The navigation/positioning (GPS) 29 may be used for location tracking. The animatronic character 20 may further include a network communication device 33 for communicating with a computer network, as discussed below. The animatronic character 20 may further include any other components that may be desired, including theatrical effects (EFX) 31, for example, lasers, lights, video display devices, and any other forms of devices (not shown) for the entertainment of a crowd.

The enhanced interaction controller 40 and input sensors 21 may share the data stream of the show controller 30.

The animatronic character 20 may be operably connected with a standard show controller 30 using any a manner known in the art, such as via a wireless network, or any other connection method known in the art. In alternative embodiments, the show controller 30 may be integrated into the animatronic character 20, and/or integrated with the enhanced interaction controller 40, as mentioned above.

The show controller 30 may include computer components such as a computer processor 32, computer memory 34, and a control program 36 for operatively controlling the operation of the animatronic character 20. The show controller 30 may be programmed with a standard show for the entertainment of people in the art. The control program 36 may, for example, control the standard operation of the animatronic character 20, controlling the servo motors 26, making sounds through the speakers 24, including simulated human speech, and providing any other entertainment known in the art. This standard show is what will automatically be performed under standard conditions (such as when there are no people in the immediate proximity of the animatronic character 20.

The enhanced interaction controller 40 may include a computer processor 41, a computer memory 42, and a bus that couples various system components including the computer processor 42 to the computer memory 42, and to other components. For purposes of this application, as discussed below, any element mentioned in the singular also includes the plural, so it is to be understood that, the term "computer processor" also includes multiple processors, and the term "computer memory" includes multiple memory devices, and either of which may be configured in any manner known in the art (i.e., in a single device, or distributed in any manner known to those skilled in the art).

As shown in FIG. 2, the enhanced interaction controller 40 may include artificial intelligence 43 (AI), convolutional neural networks 44 (CNN), and machine learning 45 (ML), for developing and delivering customized interactions with people near the animatronic character 20, as discussed in greater detail below. The animatronic character 20 can utilize the artificial intelligence 43 and react in real-time to the changing environment around it. Each robot performance will be unique and no two performances are the same. Traditional animatronic characters are controlled by just the show controller 30 built, for playback of synchronous audio, video, animation, lighting, and mechanical action. The animatronic character 20 of the present animatronics system 10 is capable of much more.

An enhanced control program 46 of the enhanced interaction controller 40 enables a range of potential actions, sounds, speech, and other effects that may be drawn upon, as discussed below, to create these highly customized routines interwoven with the standard show. The enhanced interaction controller 40 may also include a tracking program 47 for tracking people nearby, as discussed below.

Figure 3:
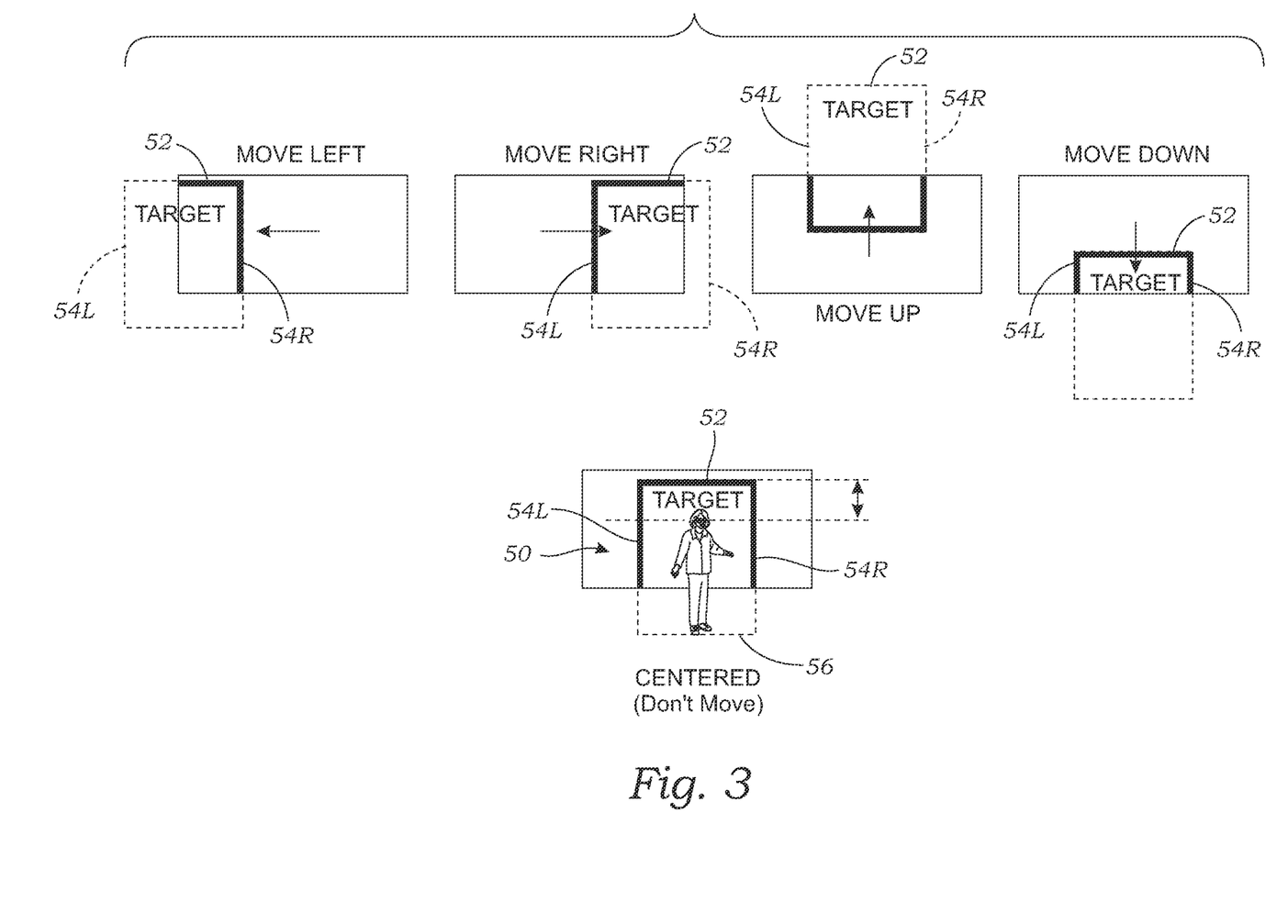
FIG. 3 is an illustration of different camera views from the animatronic character of a target such as a nearby person.

FIG. 3 is an illustration of different camera views from the animatronic character 20 of a target such as a nearby person. The tracking program 47 of FIGS. 1-2 uses a human presence detection (HPD) to detect and recognize the entire human form of nearby people. As shown in FIG. 3, the tracking program 47 electronically places a bounding box 50 around the target person from head to toe, typically at a range of 4-40 feet, although this can obviously vary as needed. The bounding box 50 includes a top line 52, right and left side lines 54R and 54L, and may include a bottom line 56 (although this is not typically used). The camera 22 (shown in FIG. 2) may be moved to maintain the bounding box 50 in the center of frame, with the top line 52 adjacent the top center of the frame.

The bounding box 50 is the mechanism whereby decisions are made. It can be utilized to identify each target, determine a distance to each target (although another range detection device, such as a laser, may also or alternatively be used). The bounding box 50 may also be used to trigger different programmed animatronic performances based upon any number of criteria such as distance, speed, guest location, etc.

In a busy environment, the system may identify all human beings (or other targets, such as pets) within its visual spectrum with bounding boxes 50, but most people may be merely identified and not tracked. The system 10 may mark the widest bounding box 50 within its visual spectrum with a thick bounding box that is actually tracked, as the closest person for the animatronic character 20 to interact. This may vary, obviously, depending upon the programmer, to determine an entertaining program. Other targets might be tracked under certain circumstances for the system 10 to interact with.

In this embodiment, the tracked bounding box 50 is what the animatronic character 20 will align itself towards. The system 10 will constantly be tracking and un-tracking humans based on what it believes to be the closest to it, with the ability to automatically change its focus to the closest proximal target in real-time. The system 10 may maintain a lock on this target even when the target moves. One of the subsets of the AI, the convolutional neural network will respond as to size of the bounding box and attempt to keep the bounding box within its visual range at all times. Example if the target moves to the left and the left side of the bounding box is no longer visible, the system will send a command to move the head to the left until the bounding box 50 is in the center. Once the system 10 has identified the target, it outlines the target with a rectangle or bounding box. In the current embodiment, the targeting priority is as follows:

The first priority is to maintain the top line 52 of Bounding box, also known as a tilt line. Most important is 10" below this line are the eyes (close enough) this is what the robot targets so it is looking in one's eyes. This line must always be in frame, This is how the system 10 targets the eyes. If the Top Line 52 of the box moves above the visual spectrum of the system 10, the "tilt" servo may move the animatronic device 20 to keep the top line within animatronics system 10 visual spectrum, and/or the animatronics system 10 may send a control command to the servo responsible for moving the entire robot backward until the top line of the bounding box is once again within animatronics system 10 visual spectrum. The animatronics system 10 may, for example, send an ASCII line command to the show controller 30 to play an angry performance show titled, "Too Close." The character might, for example, hold up its hands and say "whoa there, you are getting too close, back up buddy!" This is an exemplary option, however, and obviously a wide range of options may be used.

The second priority is to keep the right and left side lines 54R and 54L (pan lines) in the center of the frame. As shown in FIG. 3, if the targeted bounding box 50 moves to the left, the animatronic character's head (or body) will pan to the left until the bounding box is centered. Likewise if the targeted bounding box moves to the right, animatronics system 10 will send a command, to move the robots head to the right until the bounding box is centered.

The bottom line 56 of the bounding box 50 may typically be ignored, although it could be used if desired. If the system sees the bottom line it is automatically programed to seek the top line of the next tracked bounding box. The animatronics system 10 offers a revolutionary change in robotic performance and guest interactivity at theme parks. Our ability to introduce Artificial Intelligence into classic animatronic characters and along with that, the ability robots to automatically respond to the changing environment around it. Creating a unique hyper-realistic interactive experience between robots and humans. Each robot performance will be unique and no two performances will be the same.

Figure 4:
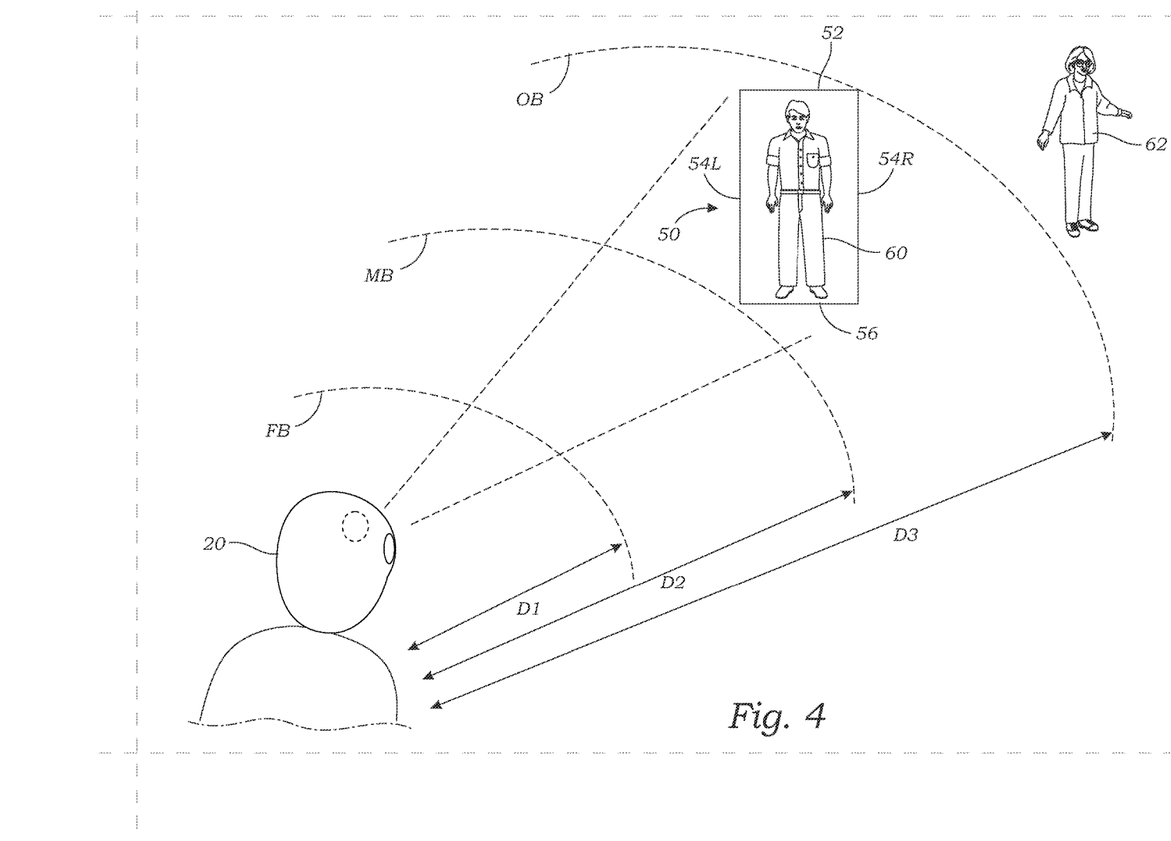
FIG. 4 is an illustration of the animatronic character interacting with a first person.

FIG. 4 is an illustration of the animatronic character 20 interacting with a first person 60 and tracking a second person 62. In this embodiment, the animatronics system 10 determines three boundaries, a first boundary FB, a middle boundary MB, and an outer boundary OB. The first boundary FB is a first distance D1 from the animatronic character, the middle boundary MB is a second distance D2 from the animatronic character, and the outer boundary OB is a third distance D3 from the animatronic character. These distances D1-D3 may be determined based upon the surrounding environment. For example, the first distance D1 may be selected to be a distance that is too close for comfortable interpersonal interaction (for a person), such as a distance a person may perceive to be within their personal space, about 3-4 feet, at which point the person may be too close to the character. The second distance D2 may be selected to the maximum distance for interpersonal interaction, such as distance a maximum person might comfortably converse with another person, around 15-20 feet in this embodiment. The third distance D3 may be the maximum range that a person typically takes note of a person, in this case about 30-40 feet.

As shown in FIG. 4, targets such as the second person 62, who are beyond the outer distance OR may be tracked, but may often be ignored as too far away. Once one of the targets, such as the first persons 60, moves closer than the outer boundary OB, the animatronic character 20 may be triggered by the enhanced interactive controller 40 (shown in FIG. 2), to perform a greeting routine, in which the animatronics character turns to the person 60, interrupting the regular routine of the show controller 30 (also shown in FIG. 2), perhaps greeting the person (via the speaker), and inviting them to listen to a story, tell a joke, or engage in some interaction. Obviously, the nature of the greeting routine may vary depending upon the show designer, but it will typically be of a nature to draw people in for more personalized interactions. As shown in FIG. 4, the second person 62 who remains outside of the outer boundary OB is ignored by the character 20, although he or she may still be tracked.

If a target passes through the first boundary FB, and gets closer that the first distance, such as the first, person 60, the animatronic character 20 is unable to keep the person in frame, and may play a "too close" routine (e.g., where the character says "hey back up buddy, you are too close!").

Figure 5:
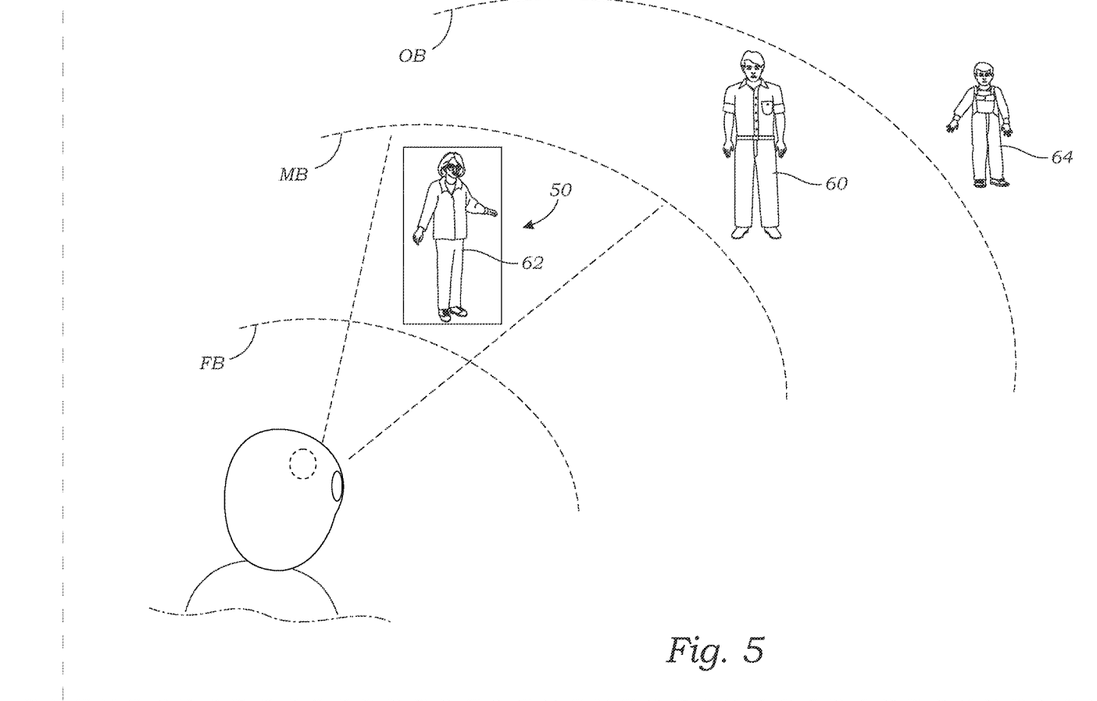
FIG. 5 is an illustration of the animatronic character interacting with a second person.

FIG. 5 is an illustration of the animatronic character 20 interacting with the second person 62, who has approached closer than the middle boundary MB, presumably to interact with the character 20, hear the story, etc. In this embodiment, the character 20 turn away from the first person 60 to engage the second person 62 who has moved within the optimal to range for interaction, closer to the animatronic character 20 than the first person 62. The animatronics system 10 turns the animatronics character 20 to engage with the second person 62 and starting an entertainment routine provided by the enhanced interactive controller 40. This may involve telling a story, asking riddles, telling jokes, and/or interacting with the person 62 in any manner determined by the system designer.

Also shown in FIG. 5, a third person 64 who remains outside of the outer barrier OB is ignored. Obviously, interactions are always possible if desired by the programmer, and these targets may all be tracked for this purpose. For example, if the system 10 determined there are many people in the distance, the character could turn to the crowd and invite them all closer. The behavior may also be modified from initial programming via the AI, CNN, and ML shown in FIG. 2, so that the system 10 learns and improves. For example, if one routine is particularly effective in drawing in people and starting successful interactions (however this may be defined), this routine may be used more frequently, while unsuccessful routines may be limited or dropped.

If a target passes through the first boundary FB, and gets closer that the first distance (not shown), the animatronic character 20 may be unable to keep the person in frame, and may play a distancing routine, such as a "too close" routine (e.g., where the character says "hey back up buddy, you are too close!"). If physically able, the animatronics character may move backwards to keep spacing from any people, both for part of the show (as the character appears to act more naturally, as a human would), and for safety purposes, to prevent any people from being injured by the animatronics character.

Obviously, while some embodiments of the present invention are described herein, those skilled in the art may develop countless rules, routines, and interactions to engage with persons nearby the animatronic character 20, for the enjoyment of the crowd, and any such alternative systems and routines should be considered within the scope of the present invention.

For purposes of this application, the term "computer memory" as used herein refers to any tangible, non-transitory storage that participates in providing instructions to a processor for execution. Such a medium may take many forms, including but not limited to, non-volatile media, volatile media, and any equivalent media known in the art. Non-volatile media includes, for example, ROM, magnetic media., and optical storage media. Volatile media includes, for example, DRAM, which typically serves as main memory. Common forms of computer memory include, for example, hard drives and other forms of magnetic media, optical media. such as CD-ROM disks, as well as various forms of RAM, ROM, PROM, EPROM, FLASH-EPROM, solid state media such as memory cards, and any other form of memory chip or cartridge, or any ether medium from which a computer can read. While several examples are provided above, these examples are not meant to be limiting, but illustrative of several common examples, and any similar or equivalent devices or systems may be used that are known to those skilled in the art As used in this application, the words "a," "an," and "one" are defined to include one or more to of the referenced item unless specifically stated otherwise. The terms "approximately" and "about" are defined to mean +/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. An animatronics system for tracking people, and interacting with a target person, the animatronics system comprising:
    an animatronic character having a camera, a speaker, and servo motors for controlling the movement of the animatronic character;
    an enhanced interaction controller operably connected with the animatronics character, the enhanced interaction controller comprising a computer processor and a computer memory having an enhanced control program and a tracking program for tracking the person;
    a show controller connected with the animatronic character through the enhanced interaction controller, the show controller comprising a computer processor and a computer memory having a control program for operatively controlling the animatronic character to perform a standard performance routine;
    wherein the tracking program utilizes human presence detection, via input from the camera, to detect and recognize the people, and to determine the target person who is closest to the animatronic character;
    wherein the enhanced control program performs the following steps:
        determining when the target person passes through a middle boundary that is a predetermined distance from the animatronics character;
        in response to the target person passing through the middle boundary, interrupting the standard performance routine of the show controller, moving the animatronic character to focus on the target person, and performing an enhanced performance routine from the enhanced interaction controller, the enhanced performance routine being specifically directed to the target person.

2. The animatronics system of claim 1, wherein the tracking program performs the following steps:
    electronically placing a bounding box around each of the people, the bounding box including a top line as well as right and left side lines; and
    identifying the widest bounding box as the person who is closest to the animatronic character, and recognizing that person as the target person.

3. The animatronics system of claim 2, wherein the enhanced control program, moves the camera so that the bounding box of the target person is located in the center of the camera frame, with the top line of the bounding box being positioned adjacent the top center of the camera frame.

4. The animatronics system of claim 2, wherein the enhanced control program performs the following additional steps:
    determining when all of the people are outside of the middle boundary; and
    in response to all of the people being outside of the middle boundary, returning control of the animatronic character to the show controller so that it can return to the standard performance routine.

5. The animatronics system of claim 1, wherein the middle boundary is 15-20 feet from the animatronic character.

6. The animatronics system of claim 1, wherein the first boundary is 3-4 feet from the animatronic character.

7. The animatronics system of claim 1, wherein the camera is in the form of a 3D vision device.

8. The animatronics system of claim 1, wherein the enhanced interaction controller further includes a microphone for enabling the animatronics system to respond to verbal interaction from the target person.

9. The animatronics system of claim 1, further comprising theatrical effects in the form of lasers which may be controlled for the entertainment of the people.

10. The animatronics system of claim 1, wherein the too close routine includes audibly telling the target person that they are too close to the animatronic character.

11. The animatronics system of claim 1, further comprising an artificial intelligence utilized by the enhanced interaction controller to favor portions of the enhanced performance routine that are the most successful in getting the people to move closer to the animatronic character.

12. The animatronics system of claim 1, further comprising the step of moving the animatronic character back away from the target person in response to the target person passing through the first boundary.

\* \* \* \* \*